United States Patent
Fish et al.

(10) Patent No.: US 6,470,073 B1
(45) Date of Patent: Oct. 22, 2002

(54) SERVICE STATE ADMINISTRATION FOR A COMMUNICATIONS APPARATUS

(75) Inventors: Robert W Fish, Lowell, MA (US); Christopher R. Sharpe, Brookline, NH (US)

(73) Assignee: Cisco Technology, Inc., San Jose, CA (US)

(*) Notice: Subject to any disclaimer, the term of this patent is extended or adjusted under 35 U.S.C. 154(b) by 55 days.

(21) Appl. No.: 09/584,912

(22) Filed: May 31, 2000

(51) Int. Cl.[7] ............................................. H04M 3/22

(52) U.S. Cl. ............... 379/32.01; 379/9.06; 379/15.01; 379/265.04

(58) Field of Search ............................. 379/35, 9, 9.06, 379/15.01, 29.08, 32.01, 399.01, 314, 265.04

(56) References Cited

U.S. PATENT DOCUMENTS

| | | | | |
|---|---|---|---|---|
| H1801 H | * | 9/1999 | Browning et al. | |
| H1860 H | * | 9/2000 | Asthana et al. | |
| H1964 H | * | 6/2001 | Hoffpauir et al. | |
| 6,279,125 B1 | * | 8/2001 | Klein | 714/38 |
| 6,282,266 B1 | * | 8/2001 | Przyblyski et al. | 379/10.01 |

* cited by examiner

*Primary Examiner*—Curtis Kuntz
*Assistant Examiner*—Barry Taylor
(74) *Attorney, Agent, or Firm*—Baker Botts L.L.P.

(57) ABSTRACT

A communications system includes a switch having communications resources such as cards containing multiple devices, each containing multiple ports. The switch also contains an administrative agent that maintains hierarchical state information for each resource within the switch. The state information allows for precise and consistent administration of interrelated communications resources within the switch.

39 Claims, 6 Drawing Sheets

| CARD STATE INFORMATION ||||| 
|---|---|---|---|---|
| CARD NUMBER | PHYSICAL STATE | CONFIGURATION STATE || OPERATIONAL STATE |
| | | TARGET | ACTUAL | |
| 1 | PRESENT | ONLINE | ONLINE | ACTIVE-REDUNDANT |
| 2 | ABSENT | ONLINE | NA | NA |
| ⋮ | ⋮ | ⋮ | ⋮ | ⋮ |
| 9 | PRESENT | OFFLINE | OFFLINE | NA |
| 12 | PRESENT | ONLINE | ONLINE | STANDBY-READY |
| ⋮ | ⋮ | ⋮ | ⋮ | ⋮ |
| 20 | PRESENT | ONLINE | OFFLINE | NA |
| 21 | ABSENT | ONLINE | OFFLINE | NA |

100

| CARD STATE INFORMATION | | | | |
|---|---|---|---|---|
| CARD NUMBER | PHYSICAL STATE | CONFIGURATION STATE | | OPERATIONAL STATE |
| | | TARGET | ACTUAL | |
| 1 | PRESENT | ONLINE | ONLINE | ACTIVE-REDUNDANT |
| 2 | ABSENT | ONLINE | NA | NA |
| ⋮ | ⋮ | ⋮ | ⋮ | ⋮ |
| 9 | PRESENT | OFFLINE | OFFLINE | NA |
| 12 | PRESENT | ONLINE | ONLINE | STANDBY-READY |
| ⋮ | ⋮ | ⋮ | ⋮ | ⋮ |
| 20 | PRESENT | ONLINE | OFFLINE | NA |
| 21 | ABSENT | OFFLINE | NA | NA |

DEVICE STATE INFORMATION - CARD 2
DEVICE STATE INFORMATION - CARD 1

| DEVICE NUMBER | PHYSICAL STATE | CONFIGURATION STATE | | OPERATIONAL STATE |
|---|---|---|---|---|
| | | TARGET | ACTUAL | |
| 1 | PRESENT | ONLINE | ONLINE | ACTIVE-SINGLE |
| 2 | PRESENT | OFFLINE | OFFLINE | NA |
| ⋮ | ⋮ | ⋮ | ⋮ | ⋮ |
| M | PRESENT | ONLINE | ONLINE | UNAVAILABLE |

PORT STATE INFORMATION - CARD 1; DEVICE 2
PORT STATE INFORMATION - CARD 1; DEVICE 1

| PORT NUMBER | PHYSICAL STATE | CONFIGURATION STATE | | OPERATIONAL STATE |
|---|---|---|---|---|
| | | TARGET | ACTUAL | |
| 1 | PRESENT | ONLINE | ONLINE | ACTIVE-SINGLE |
| 2 | PRESENT | ONLINE | ONLINE | ACTIVE-REDUNDANT |
| ⋮ | ⋮ | ⋮ | ⋮ | ⋮ |
| N | PRESENT | OFFLINE | OFFLINE | NA |

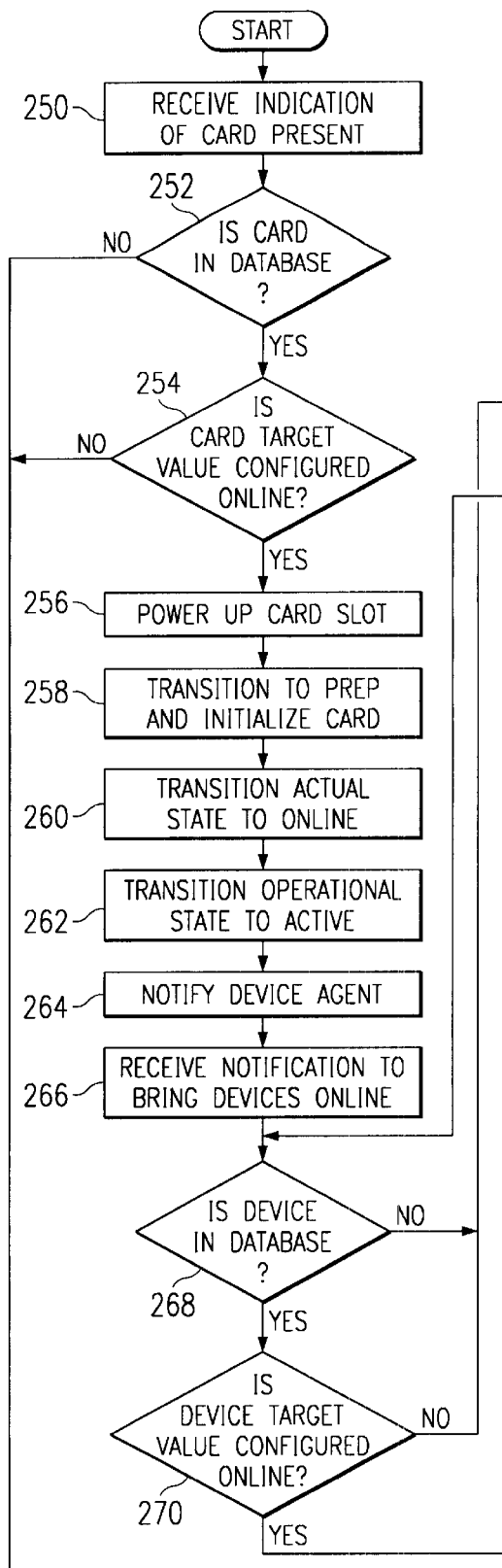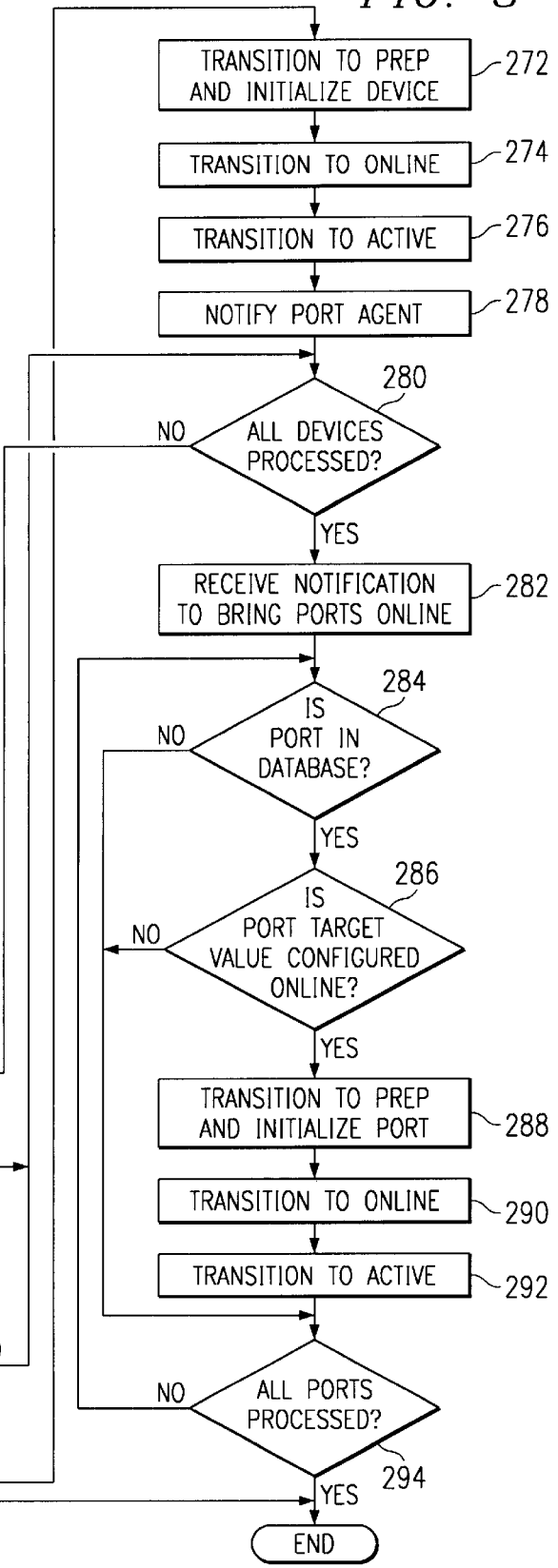
FIG. 8

SERVICE STATE ADMINISTRATION FOR A COMMUNICATIONS APPARATUS

TECHNICAL FIELD OF THE INVENTION

The present invention relates generally to communications systems and more particularly to service state administration for a communications apparatus.

BACKGROUND OF THE INVENTION

Telecommunications switches form the backbone of telephony networks, interconnecting a variety of telecommunications devices. These switches typically contain interface cards, with each card having multiple ports for connecting to other telecommunications devices. Maintaining and accessing information describing the current condition of these telephony resources (cards and ports), can be difficult and time-consuming. Often, each card in the switch will have an LED indicating generally the state of the card. This LED typically indicates a fairly generic condition, for example, an LED that indicates whether the card is receiving power. Determining the precise state of a card may be difficult, and even obtaining limited information often requires direct physical access to the switch.

In addition, maintaining and administering an increasing number of ports on each card presents a significant task, both from the user standpoint and from a design standpoint. Because of delays inherent in managing a large number of resources and the increasing complexity of switching systems, users are often confronted with extended lags between administrative requests and the perceived responses by the switch. Also, the interfaces for controlling various resources are becoming more complex, yet rarely offer sufficient feedback to provide users with detailed information about the operation of the resources within a switch.

SUMMARY OF THE INVENTION

In accordance with the present invention, service state administration for a communications apparatus is provided which substantially eliminates or reduces disadvantages and problems associated with previous systems and methods. In a particular embodiment, the present invention provides a hierarchical service state administration agent that provides precise and consistent administration of interrelated communications resources.

According to one embodiment of the present invention, an administrative agent for maintaining service state information for a telecommunications apparatus includes a card agent, a device agent, and a port agent. The card agent maintains card state data for a plurality of cards, the device agent maintains device state data for a plurality of devices on the cards, and the port agent maintains port state data for a plurality of ports on the devices. The card state data, the device state data and the port state data each indicate a physical state, a configuration state, and an operational state.

In accordance with another embodiment of the present invention, a hierarchical model for maintaining states of a telephony resource includes a first level, a second level and a third level. The first level indicates whether a resource is physically present. The second level has a user configurable target value set to ONLINE or OFFLINE and an actual value indicating whether the resource is ONLINE or OFFLINE. Moreover, the actual value of the second level is valid only when the first level indicates that the resource is PRESENT. The third level indicates an internal state of the resource, and the internal state is valid only when the actual value is valid and indicates that the resource is ONLINE.

According to another embodiment of the present invention, a method for transitioning a telecommunications apparatus ONLINE receives notification to place a first resource ONLINE and transitions the first resource ONLINE.

The method also transitions a plurality of second resources dependent on the first resources ONLINE, and transitions a plurality of third resources dependent on the second resources ONLINE. The method transitions a resource to ONLINE after the resource receives a notification to go ONLINE. To transition a resource to ONLINE, the method determines whether the resource has a target state set to ONLINE, sets an actual state to ONLINE if the target state is set ONLINE, and notifies any dependent resources of the resource to go ONLINE if the actual state is set ONLINE.

In accordance with another embodiment of the present invention, a method for transitioning a telecommunications apparatus OFFLINE targets a first resource to go OFFLINE, notifies a plurality of second resources depending on the first resource to go OFFLINE, and notifies a plurality of third resources dependent on the second resources to go OFFLINE. For each of the second resources and the third resources, the method stores a target configuration state indicating whether a user has configured each resource to ONLINE or OFFLINE. The method also sets an actual state for each of the third resources to OFFLINE, sets an actual state for each of the second resources to OFFLINE, and sets an actual state for the first resource to OFFLINE.

The invention provides a number of technical advantages. The invention provides a more effective and user-friendly approach to maintaining and administering state information for telephony resources and for controlling transitions between the states. The system tracks multiple levels of communications resources and accurately models the dependencies of these resources. For example, given a card with multiple devices and each device having multiple ports, the state of a card dictates the potential states for devices on the card. Similarly, the state of a device dictates the potential states for ports on the device. In addition, the system uses a state model that maintains consistent information irrespective of the type of resource the state information describes. For example, the information describing the state of a card uses the same state model as the information describing the state of a port.

Also, the state model allows a user to accurately determine the precise state of a resource using three levels: a physical state, a configuration state, and an operational state of the resource. Moreover, the state model tracks interdependencies between these three levels, creating a hierarchical model to precisely indicate the current condition of a resource. Thus the present invention provides a system to track the interdependencies between multiple levels of resources and multiple levels of states using a unified state model. This ensures that the current state for any given resource reflects the interdependencies among cards, devices and ports and among physical states, configuration states, and operational states.

The present invention provides a unified system for administering communications resources within a switch. Moreover, this system may be remotely administered while still allowing a user to access precise information describing the current state of each resource within a switch. In addition, using the configuration state, a user may independently configure any resource within a switch, from an entire card down to an individual port.

Other technical advantages of the present invention will be readily apparent to one skilled in the art from the following figures, descriptions, and claims.

BRIEF DESCRIPTION OF THE DRAWINGS

For a more complete understanding of the present invention and the advantages thereof, reference is now made to the following descriptions, taken in conjunction with the accompanying drawings, in which:

FIGS. 5A, 5B, and 5C illustrate exemplary tables for maintaining state information for the resources;

FIG. 8 is a flowchart of a method for transitioning a card ONLINE using the state model.

DETAILED DESCRIPTION OF THE INVENTION

Figure 1:
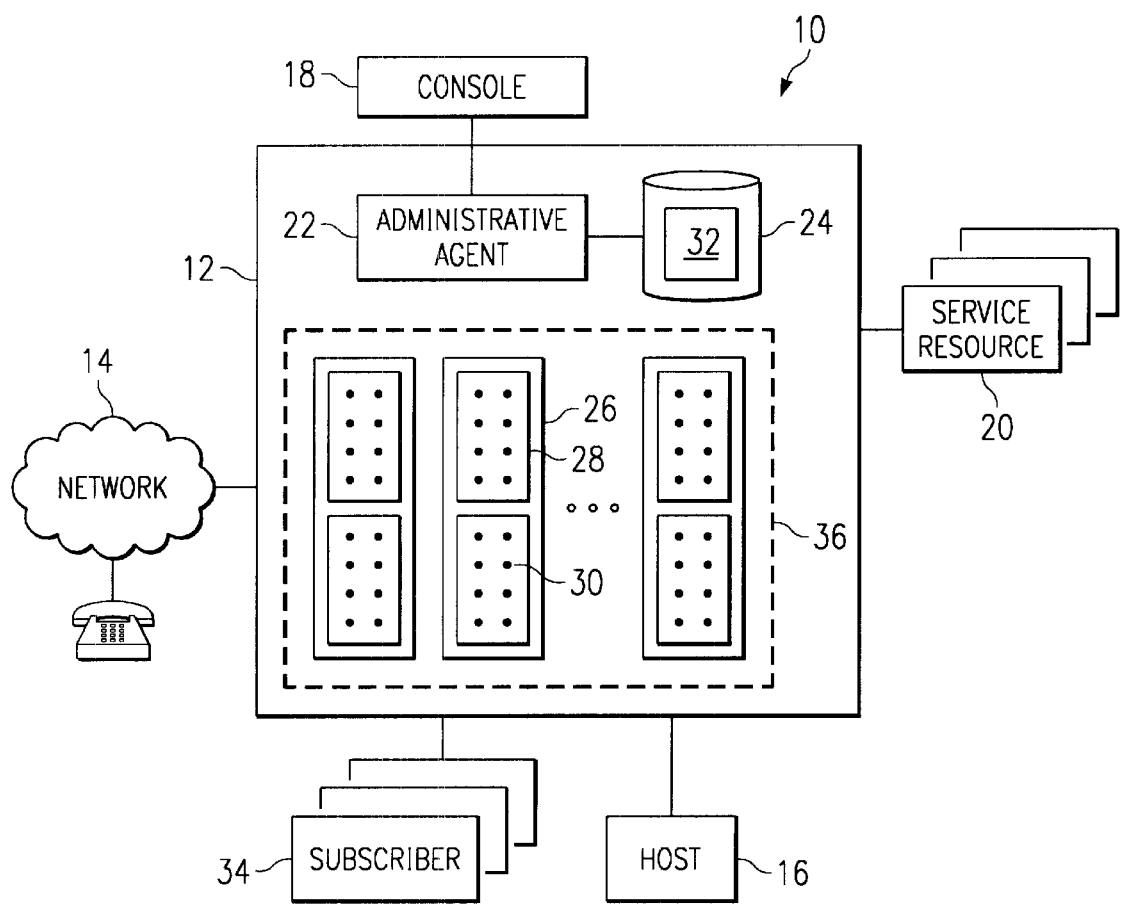
FIG. 1 illustrates a system for service state administration of communications resources in accordance with the teachings of the present invention.

FIG. 1 illustrates a system 10 that includes a switch 12 coupled to a network 14, a host 16, a console 18, and service resources 20. Switch 12 contains an administrative agent 22 coupled to a memory 24 storing state information 32, and switch 12 also contains a number of interrelated communications resources 36. In general, administrative agent 22 maintains state information 32 to provide consistent and accurate information describing communications resources 36 and to allow for administration of these resources.

Switch 12 represents any communications apparatus containing multiple resources 36 for connecting to subscriber systems. Switch 12 may be a switch, media gateway, router, or other suitable apparatus for connecting to multiple subscriber systems. Resources 36 represent links providing wireless or wireline connectivity between switch 12 and other communications devices in system 10. Host 16 represents hardware and/or software for controlling the operations of switch 12, for example, a call agent or a legacy application communicating with switch 12 using an appropriate application program interface (API). Console 18 represents hardware and/or software for accessing and administering to state information 32 using administrative agent 22. Console 18 provides local or remote access to allow users of system 10 to operate, administer, and manage switch 12. Furthermore, operation, administration, and management of switch 12 may be accomplished wholly or in part by host 16 or automatically and internally within switch 12.

Service resources 20 represent hardware and/or software for providing communications services, such as a voice response unit (VRU) providing interactive access to telecommunications services through voice prompts. Network 14 represents any collection and arrangement of hardware and/or software providing communications between switch 12 and other telephony devices. For example, network 14 may be one or a collection of components associated with the public switch telephone network (PSTN), local area networks (LANS), wide area networks (WANS), a global computer network such as the Internet, or other suitable wireline or wireless communications technology that supports communications between multiple devices. Switch 12 may connect to network 14 using any appropriate wireless or wireline interface.

Administrative agent 22 represents controlling hardware and/or software for maintaining state information 32 and for operating and administering resources 36 in switch 12. Memory 24 represents any one or combination of volatile or nonvolatile, local or remote devices suitable for storing data, for example, random access memory (RAM) devices, read-only memory (ROM) devices, magnetic storage devices, optical storage devices, or any other suitable data storage devices.

In a particular embodiment, communications resources 36 include cards 26, devices 28 and ports 30. Cards 26 represent hardware and/or software within switch 12 for interfacing with other communications equipment, local or remote, using appropriate protocols. Cards 26 may contain any number of devices and may be fixed or removable. For example, card 26 may contain multiple T-1 devices 28 and be removably inserted in a slot on a chassis in switch 12. Device 28 represents any logical subdivision of ports 30 on card 26. This logical subdivision may be dictated by any design considerations, such as the industry standard of twenty-four ports 30 on a T-1 card, available chipsets, or other considerations. Ports 30 represent hardware and/or software providing an interface between switch 12 and subscriber communications equipment 34. For example, ports 30 may provide an interface for connecting to a cable from subscriber equipment 34 that supports communications using T-1, E-1, ISDN or any other suitable communications protocol. Card 26, devices 28, and ports 30 may be coupled to the network side, typically providing high-bandwidth communications, or to the subscriber side, typically providing more limited bandwidth. While FIG. 1 includes a defined set of communications resources 36, system 10 contemplates switch 12 containing any combination and arrangement of resources that may be described using a hierarchical model.

In a particular embodiment, switch 12 includes a chassis that contains twenty-one slots for inserting cards 26. These slots may be empty, may contain cards 26, or may contain a combination of cards 26 and other types of cards, such as management/control cards and telephony services cards. Management/control cards aid in the management and control of switch 12, and telephony services cards allow switch 12 to offer users services such as tone detection, tone generation, dual tone multi-frequency (DTMF), conferencing, call progress, and other telephony services.

In operation, users of system 10 interact with administrative agent 22 using console 18. Administrative agent 22 controls operation, administration, and management of resources 36 using state information 32. In general, administrative agent 22, using state information 32, provides a unified state model for administering resources 36. This model provides consistent and predictable rules for transitioning multiple interdependent resources between a variety of operational states. While console 18 and administrative agent 22 are shown as separate functional blocks, the functionality of these modules may be combined or broken down into smaller functional units, and each individual functionality may be implemented using any suitable hardware and/or software, such as a computer program stored on a computer readable medium. While some of the following descriptions focus on the operation of system 10 as a telecommunications system, the principles, methods, and functions outlined may be applied to other communications media.

Figure 2:
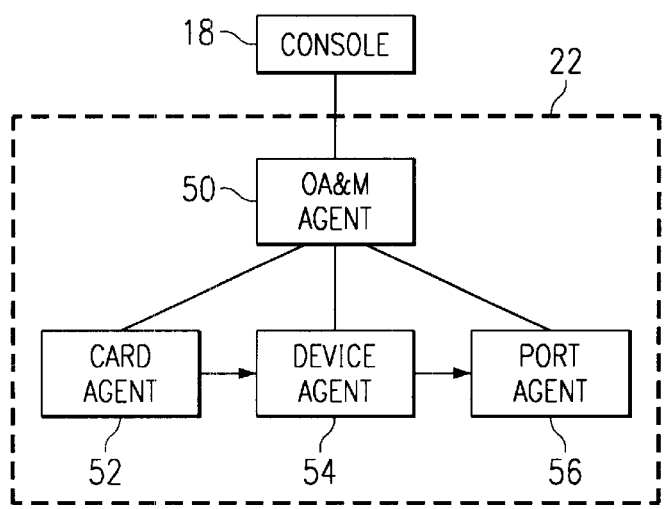
FIG. 2 is a block diagram illustrating the relationship between functional modules for administering to state information describing the resources.

FIG. 2 illustrates the relationship between console 18 and administrative agent 22, and between functional modules within administrative agent 22. Administrative agent 22 includes an operational, administrative and management (OA&M) agent 50; a card agent 52; a device agent 54; and a port agent 56. In general, console 18 provides users of system 10 an interface to the operational, administrative, and management features of administrative agent 22. Within administrative agent 22, OA&M agent 50 maintains and administers communications resources 36 using card agent 52, device agent 54, and port agent 56. Card agent 52, device agent 54, and port agent 56 aid in the administration of state information 32 for cards 26, devices 28 and ports 30, respectively. In maintaining state information 32, these agents model the dependencies of communications resources 36, given that ports 30 are dependent on devices 28, and devices 28 are dependent on cards 26. Thus, OA&M agent 50 controls the operation of card agent 52, device agent 54, and port agent 56 based on communications with users of system 10 via console 18, the interdependencies of the resources, and any other conditions affecting the operation of resources 36. In a particular embodiment, administrative agent 22 includes one of each type of agent (card, device, and port), however, system 10 contemplates administrative agent 22 having multiple agents for each level. For example, each device may have an associated device agent 54 spawned dynamically when a new device is detected within switch 12.

Card agent 52, based on communication with OA&M agent 50, maintains state information 32 describing cards 26. In addition, card agent 52 communicates with device agent 54 when conditions affecting cards 26 require administration of devices 28 by device agent 54. Device agent 54, based on communications with OA&M agent 50 and card agent 52, maintains state information 32 describing devices 28. Also, device agent 54 communicates with port agent 56 when conditions affecting devices 28 require administration of ports 30 by port agent 56. Port agent 56, based on communications with OA&M agent 50 and device agent 54, maintains state information 32 described in ports 30. In addition, card agent 52, device agent 54, and port agent 56 may control the operation and administration of resources 36, such as the transitioning of resources 36 between different states. For example, a user of system 10, using console 18, may request switch 12 to bring port 30 ONLINE. OA&M agent 50 communicates this request to port agent 56. Port agent 56 then transitions port 30 to ONLINE and updates state information 32 to reflect the ONLINE status.

Figures 3, 4:
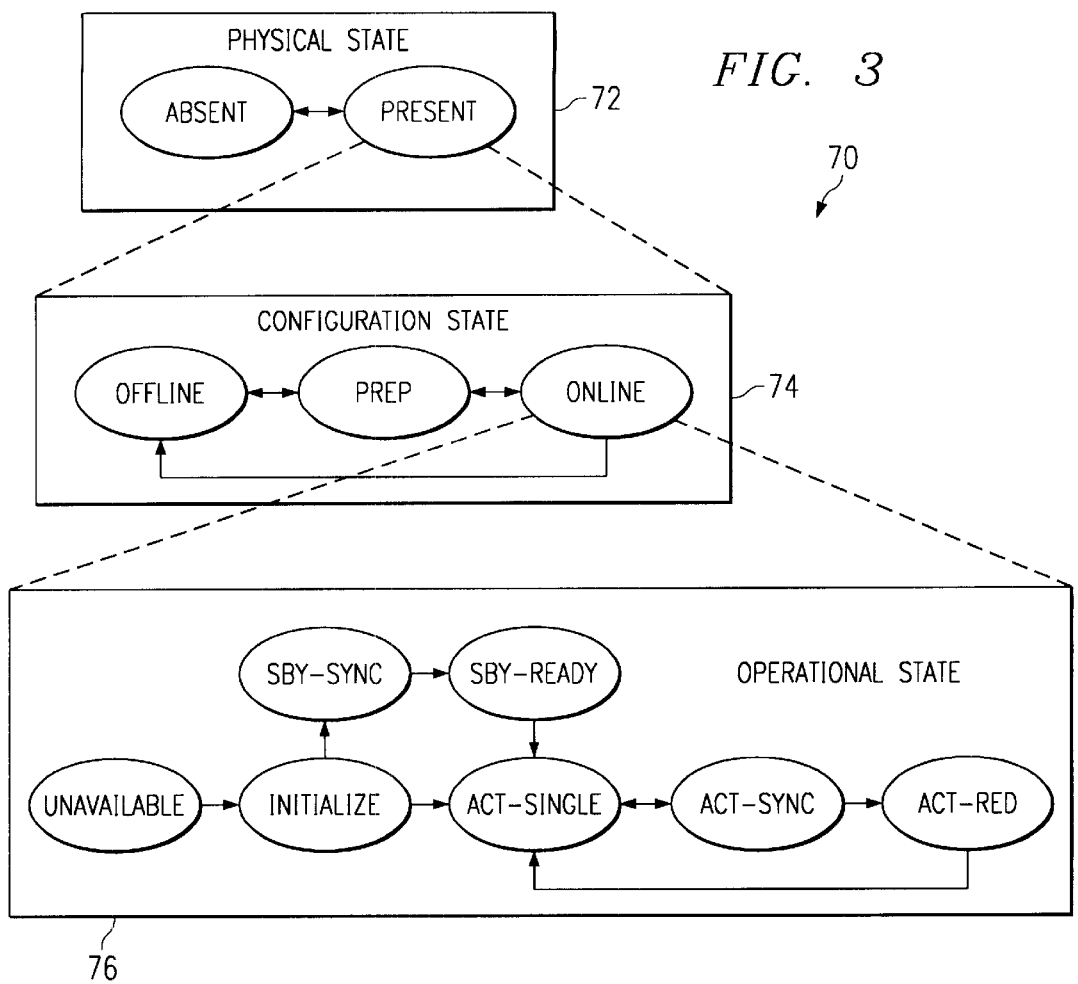
FIG. 3 illustrates an exemplary model for hierarchically maintaining state information describing the resources.
FIG. 4 illustrates interdependencies between the states of the hierarchical model for a card and devices on the card.

FIG. 3 illustrates a state model 70 that indicates the precise condition of one communications resource 36 using the hierarchical relationship between three state levels: a physical state 72, a configuration state 74, and an operational state 76. Within each level, there are a number of valid states, and the current state on one level dictates the validity of states on lower levels. In general, state model 70 provides a unified state model for cards 26, devices 28, and ports 30 that reflects the dependencies between physical state 72, configuration state 74, and operational state 76.

In a particular embodiment, physical state 72 indicates whether a resource is ABSENT or PRESENT. A value of ABSENT for physical state 72 indicates that no card is present within a slot on switch 12, while a value of PRESENT indicates that there is a card within that slot. Configuration state 74 contains both a user configurable target value and an actual value, each indicating a value of OFFLINE or ONLINE. The target value represents the choice of a user to set the resource to ONLINE or OFFLINE. This value persists regardless of the actual value for configuration state 74 or physical state 72. The actual value for configuration state 74 represents whether the resource is actually ONLINE or OFFLINE. The actual value may also reflect a preparation state (PREP) as the resource transitions between OFFLINE and ONLINE. Operational state 76 maintains a value indicating an internal state of the resource, such as UNAVAILABLE, INITIALIZING, STANDBY-SYNCHRONIZING, STANDBY-READY, ACTIVE-SINGLE, ACTIVE-SYNCHRONIZING, or ACTIVE-REDUNDANT.

State model 70 reflects the hierarchical interdependencies of the different states of a resource. For example, it would be inconsistent to report configuration state 74 or operational state 76 for a resource with a value of ABSENT for physical state 72. Thus, configuration state 74 and operational state 76 are only valid given a value of PRESENT for physical state 72. Similarly, it would be inconsistent to report operational state 76 for a resource with a value of OFFLINE or PREP for configuration state 74. Thus, operational state 76 for a resource is valid only when the actual value for configuration state 74 reflects an ONLINE state.

In operation, card agent 52, device agent 54 and port agent 56 maintain state information 32 describing physical state 72, configuration state 74, and operational state 76 for each card 26, device 28, and port 30 in switch 12. Thus, state information 32 provides a database describing the precise condition of each resource in switch 12. This card state data, device state data, and port state data may be used by administrative agent 22 for administration and management, and may be accessed by users of system 10 using console 18. In addition, using state model 70 in conjunction with agents 52 through 56, system 10 provides a unified and consistent model for maintaining state information 32 that reflects the physical interdependencies between cards 26, devices 28, and ports 30, and between physical state 72, configuration state 74, and operational state 76.

Furthermore, state model 70 provides consistent rules for the transitioning of communications resources 36 between various states. For example, when a resource becomes PRESENT, card agent 52 transitions the actual value for configuration state 74 to ONLINE (given a target value set to ONLINE). After a resource transitions to ONLINE, operational state 76 begins at UNAVAILABLE and then transitions through states until reaching a state of ACTIVE-SINGLE (when operating alone), ACTIVE-REDUNDANT (when operating with a backup), or STANDBY-READY (when operating as the backup to another resource). This example further highlights the dependencies between operational state 76 for similar resources. For example, operational state 76 of STANDBY-SYNCHRONIZING indicates that a similar resource is in operational state 76 of ACTIVE-SYNCHRONIZING, and operational state 76 of STANDBY-READY indicates that a similar resource has operational state 76 of ACTIVE-REDUNDANT.

FIG. 4 illustrates the relationship between states of card 26 and device 28 on card 26. This chart exemplifies the effects of the dependencies of devices 28 on card 26. In general, the current state for a resource dictates the possible states for any of its dependent resources (where ports are dependent on devices, and devices are dependent on cards). In this chart, the current state of card 26 is indicated in the Y-axis, and the possible states for dependent device 28 are indicated on the X-axis. In addition, the current states for card 26 and device 28 obey the hierarchy set forth in FIG. 3.

In the chart of FIG. 4, valid states for device 28 are indicated using a shaded box. For example, given physical state 72 of ABSENT for card 26, the only valid state for device 28 is ABSENT. At the other extreme, if card has physical state 72 of PRESENT, configuration state 74 of ONLINE, and operational state 76 of ACTIVE (or STANDBY-READY), then dependent devices 28 may reflect a similar state of PRESENT, ONLINE, and ACTIVE. During some intermediate states, card 26 may be in a state that prevents dependent device 28 from reaching a similar state. For example, if card 26 has physical state 72 of PRESENT, configuration state 74 of ONLINE and operational state of INITIALIZING, then dependent device 28 may only validly reach a state of PRESENT, ONLINE, and UNAVAILABLE. This reflects the reality that card 26 must become active before dependent device 28 may initialize and become active.

While this chart demonstrates the relationship between cards 26 and devices 28, a similar relationship exists between devices 28 and ports 30. Furthermore, system 10 contemplates any multi-tiered state model using a variety of interdependent states to describe the current condition of a resource and/or its dependent resources.

FIGS. 5A, 5B and 5C illustrate exemplary tables for maintaining state information 32. FIG. 5A illustrates a card state information table 100 maintaining state information 32 describing cards 26. Because slots #10 and #11 typically contain management/control cards, this table only includes state information 32 for cards 26 in slots #1–#9 and #12–#21. For each card 26 in card state information table 100, a value is indicated for physical state 72, configuration state 74, and operational state 76. Each of these values reflect the hierarchical rules as shown in FIG. 3. For example, because card 26 in slot #2 (card #2) has physical state 72 of ABSENT, the actual value for configuration state 74 and the value for operational state 76 are each set to not applicable (NA). Card state information table 100 also indicates that card 26 in slot #1 (card #1) is PRESENT. Thus, configuration state 74 for card #1 contains a valid state and is set to ONLINE. Moreover, because the actual value for configuration state 74 is set to ONLINE, the value for operational state 76 for card #1 is valid and, in this example, is set to ACTIVE-REDUNDANT. As previously discussed, a resource with operational state 76 of ACTIVE-REDUNDANT indicates that a similar resource has an operational state of STANDBY-READY. Thus, in this example, card 26 in slot #12 with operational state 76 of STANDBY-READY provides a backup in case card #1 fails.

In addition, card state information table 100 exemplifies the persistent nature of the target value for configuration state 74. This value represents a target configured by a user of system 10, and is maintained regardless of physical state 72, the actual value for configuration state 74, or operational state 76. A target value for a resource indicates whether switch 12 will attempt to transition that resource to an actual value of ONLINE when that transition becomes possible. For example, card state information table 100 indicates that card 26 in slot #2 (card #2) is ABSENT, but the target value for card #2 is configured to ONLINE. Thus, when physical state 72 indicates that card #2 is PRESENT, switch 12 will attempt to transition this card to an actual value of ONLINE. State information 32 for card 26 in slot #21 (card #21) provides an additional example for the interaction between the target value and the actual value for configuration state 74. Card state information table 100 indicates that this card is ABSENT and configured to a target value of OFFLINE. Thus, when card #21 becomes PRESENT, switch 12 will not attempt to transition this resource to ONLINE, and the actual value for configuration state 74 will be set to OFFLINE. Thus, switch 12 attempts to transition resources such that their actual value reflects their target value, but does so within the constraints of the hierarchy of state model 70 and the dependencies between different resources.

FIG. 5B illustrates a device state information table 102 maintaining state information 32 describing devices 28 on cards 26. This example illustrates that multiple device state information tables 102 are maintained, one for each card 26 in switch 12. As with card state information table 100, device state information table 102 maintains state information 32 including physical state 72, configuration state 74, and operational state 76 for each device 28. State information 32 is maintained for any number of devices 28 on each card 26. As previously discussed, the target value for configuration state 74 for devices 28 indicates a persistent value, and switch 12 attempts to transition each device 28 to its target value within the constraints of the dependencies between the resources and the hierarchies of state model 70.

FIGS. 5C illustrates a port state information table 104 that contain state information 32 describing ports 30 on devices 28. This includes physical state 72, a target value and an actual value for configuration state 74, and operational state 76 for each port 30 within switch 12. While card state information table 100, device state information tables 102, and port state information tables 104 are shown in a particular format, system 10 contemplates any arrangement and/or data storage technique suitable for maintaining state information 32 describing cards 26, devices 28, and ports 30.

Figure 6:
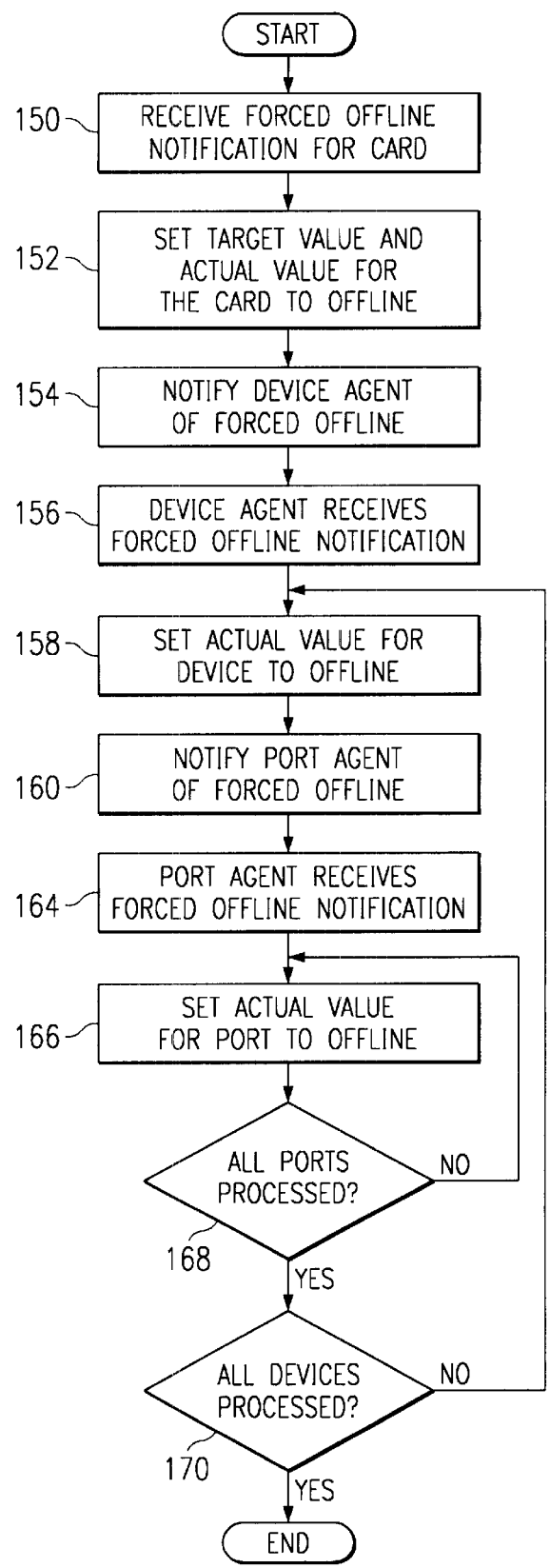
FIG. 6 is a flowchart of a method for immediately transitioning a card OFFLINE using the state model.

FIG. 6 illustrates a method for transitioning a card to OFFLINE responsive to a user request or an automated command by host 16, agent 22, or other device to force the card OFFLINE. A user, at a local or remote location, may use console 18 to request a forced offline for card 26. OA&M agent 50 receives a forced OFFLINE notification for card 26 and notifies card agent 52 to force card 26 OFFLINE at step 150. Responsive to the forced OFFLINE notification from OA&M agent 50, card agent 52 transitions card 26 to OFFLINE and sets the actual value and the target value for configuration state 74 for card 26 to OFFLINE at step 152. Card agent 52 notifies device agent 54 of the forced OFFLINE at step 154. This notification indicates that device agent 54 must force OFFLINE all devices 28 dependent on card 26.

Responsive to the forced OFFLINE notification from card agent 52, device agent 54 transitions device 28 on card 26 to OFFLINE and sets the actual value for configuration state 74 for device 28 to OFFLINE at step 158. Device agent 54 notifies port agent 56 of the forced OFFLINE at step 160. This notification indicates that port agent 56 must force OFFLINE all ports 30 dependent on device 28.

Port agent 56 receives a forced OFFLINE notification from device agent 54 at step 164. Responsive to the forced OFFLINE notification, port agent 56 transitions port 30 to OFFLINE and sets the actual value for configuration state 74 for port 30 to OFFLINE at step 166. Port agent 56 determines whether all ports 30 dependent on devices 28 on card 26 have been processed at step 168. If not, flow returns to step 166, and the process is repeated until all dependent ports 30 have been transitioned to OFFLINE and the actual value for each of these ports 30 has been set to OFFLINE.

Device agent 54 determines whether all devices 28 dependent on card 26 have been processed at step 170. If not, flow returns to step 158. Thus, the flow loops such that all devices 28 dependent on card 26 are transitioned to OFFLINE, the actual value for configuration state 74 for each device 28 is set to OFFLINE, and port agent 56 is notified to force OFFLINE all ports 30 dependent on devices 28 on card 26.

While the steps in this flowchart are shown taking place sequentially, system 10 contemplates many of the steps taking place substantially simultaneously, with the forced OFFLINE notification cascading from card agent 52 to device agent 54 to port agent 56, causing card 26, devices 28 and ports 30 to all transition to OFFLINE at virtually the same time. In addition, this flowchart illustrates the persistent nature of the target value for configuration state 74. While the actual value for each resource associated with card 26 is set to OFFLINE, only one target value is set to OFFLINE, the target value for card 26. Thus, state information 32 stores the target value for each device 28 and port 30 on card 26 allowing these values to persist even when card 26 is OFFLINE or ABSENT. This allows a user of system 10 to individually target each resource in switch 12 to ONLINE or OFFLINE, regardless of all other state information 32. For example, if an individual subscriber coupled to a specific port 30 fails to pay his bills, that specific port 30 may be configured to a target value to OFFLINE preventing this port 30 from ever becoming active regardless of changes of state for each associated device 28 or card 26.

Furthermore, while this flowchart illustrates a method for forcing card 26 OFFLINE, a similar cascading technique may be employed to force an individual device 28 and its dependent ports 30 OFFLINE, or a specific port 30 may be forced OFFLINE.

Figure 7:
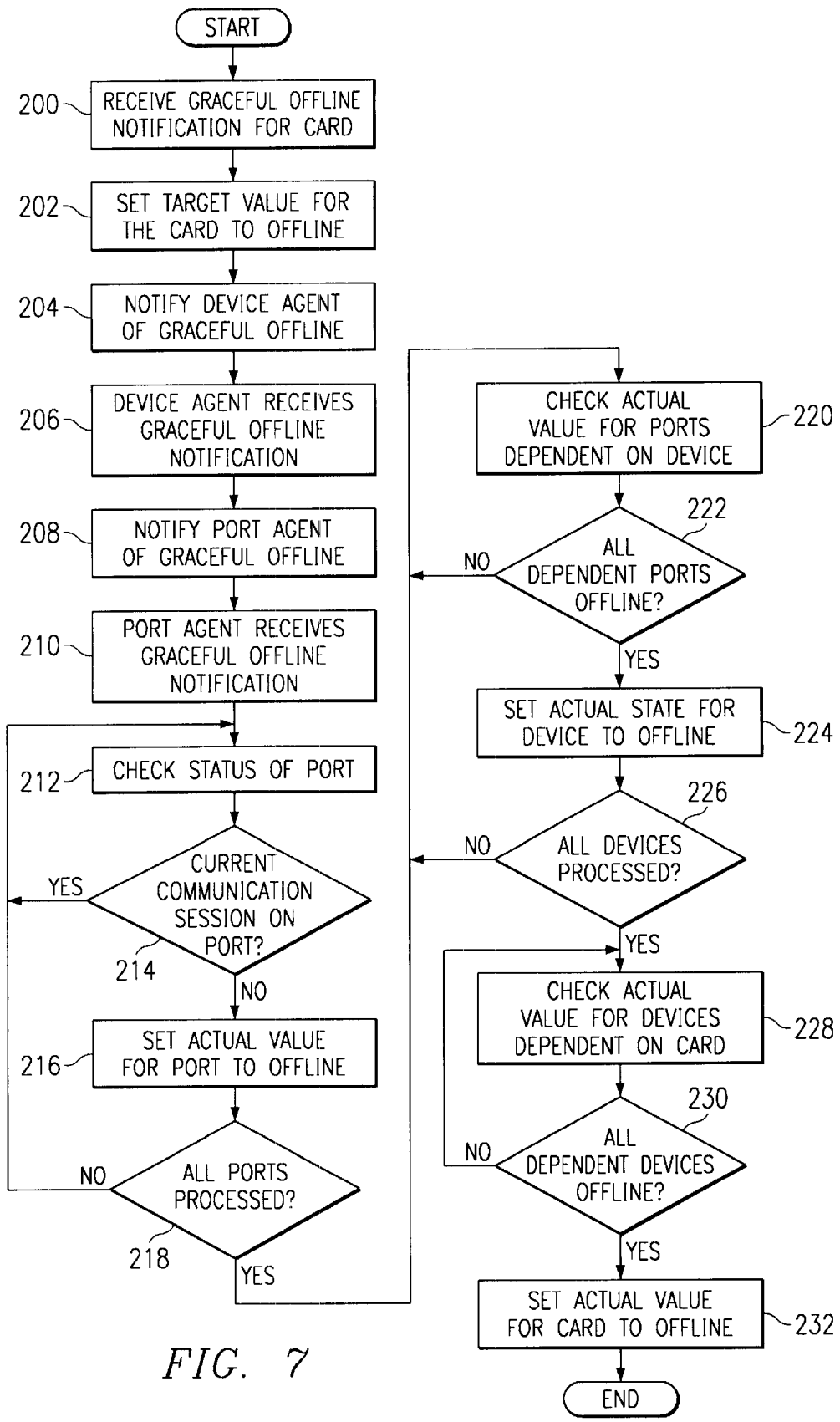
FIG. 7 is a flowchart of a method for gracefully transitioning a card OFFLINE using the state model.

FIG. 7 is a flowchart illustrating a method for gracefully transitioning card 26 to OFFLINE. This graceful transition allows all ports 30 on card 26 to complete their current activities before card 26 is transitioned to OFFLINE. OA&M agent 50 receives a graceful OFFLINE notification for card 26 at step 200. Responsive to the graceful OFFLINE notification, card agent 52 sets the target value for card 26 to OFFLINE and notifies device agent of the graceful OFFLINE at steps 202 and 204 respectively. Device agent 54 receives the graceful OFFLINE notification from card agent 52 and notifies port agent 56 of the graceful OFFLINE at steps 206 and 208 respectively.

Steps 210–218 represent the actions of port agent 56 in transitioning ports 30 OFFLINE responsive to receiving a graceful OFFLINE notification. Port agent 56 receives the graceful OFFLINE notification from device agent 54 at step 210. Port agent 56 checks the status of port 30 and determines whether there is a current communication session on port 30 at steps 212 and 214 respectively. If there is a current communication session on port 30, port agent 56 rechecks the status of port 30 at step 212. This loop allows port agent 56 to monitor the status of port 30 until port 30 is no longer active. Port agent 56 may alternatively make any type of determination at step 214 in order to decide whether port 30 may be transitioned to OFFLINE without disrupting current activities. If port agent 56 determines that there is no current communication session, port agent 56 transitions port 30 to OFFLINE and sets the actual value for configuration state 74 for port 30 to OFFLINE at step 216. Port agent 56 determines whether all ports 30 have been processed at step 218. If not, processing of ports 30 continues at step 212 until all ports 30 have been allowed to become inactive and subsequently transitioned to OFFLINE.

Steps 220–226 represent the actions of device agent 54 in transitioning devices 28 to OFFLINE responsive to receiving a graceful OFFLINE notification. Device agent 54 checks the actual value for ports 30 dependent on device 28 at step 220. Device agent 54 determines whether all ports 30 dependent on device 28 have an actual value of OFFLINE at step 222. If not, device agent 54 rechecks the actual values at step 220. Thus, device agent 54 continually monitors the status of ports 30 dependent on device 28 until all of these ports 30 have been transitioned to OFFLINE. If device agent 54 determines that all ports 30 dependent on device 28 have an actual value of OFFLINE, device agent 54 transitions device 28 to OFFLINE and sets the actual value for configuration state 74 to OFFLINE at step 224. Device agent 54 determines whether all devices 28 on card 26 have been processed at step 226. If not, device agent 54 returns to step 220. Thus, device agent 54 continually monitors ports 30 on devices 28 and transitions each device 28 to OFFLINE when all ports 30 dependent on that device have gone OFFLINE.

At steps 228–232, card agent 52 operates to gracefully transition card 26 to OFFLINE. Card agent 52 checks the actual value for devices 28 on card 26 at step 228. Card agent 52 determines whether all devices 28 on card 26 have an actual value of OFFLINE at step 230. If not, card agent 52 rechecks the actual value for devices 28 at step 228. Thus, card agent 52 continually monitors devices 28 on card 26 until all devices 28 are transitioned to OFFLINE. When all devices 28 are transitioned to OFFLINE, card agent 52 transitions card 26 to OFFLINE and sets the actual value for configuration state 74 for card 26 to OFFLINE at step 232.

As with the previous flowchart illustrating a method for forcing card 26 to OFFLINE, this method preserves target values for configuration state 74 for all devices 28 and ports 30 on card 26. In addition, many of the steps in this flowchart may take place in parallel, for example, device agent 54 may continually monitor a number of devices 28 dependent on multiple devices 28. This parallel processing is somewhat limited in that all ports 30 on device 28 must be transitioned to OFFLINE before device 28 may be transitioned to OFFLINE, and all devices 28 on card 26 must be transitioned to OFFLINE before card 26 may be transitioned to OFFLINE. These limitations allow all resources associated with card 26 to be transitioned to OFFLINE without disrupting communications sessions in progress on card 26. Moreover, if a second card 26 is available to operate as a backup to the card transitioning offline, this graceful offline process can take place without subscriber equipment ever detecting a break in service. In addition, a similar technique may be used to transition devices 28 or ports 30 offline gracefully.

FIG. 8 is a flowchart illustrating a method for transitioning card 26 ONLINE. OA&M agent 50 receives indication that card 26 is PRESENT and notifies card agent 52 at step 250. Card agent 52 determines whether the card state data contained in state information 32 has an entry for card 26 at step 252. If not, then processing is complete. If state information 32 does exist for card 26, card agent 52 determines whether the target value for configuration state 74 is set to ONLINE at step 254. If not, then processing is complete. If card 26 is configured to ONLINE, card agent 52 powers up the slot for card 26, transitions the actual state to PREP while initializing card 26, and then transitions the actual state to ONLINE at steps 256, 258 and 260 respectively. Initializing card 26 may include downloading controlling software, run-time data, or other appropriate information. Run-time data may indicate such conditions as whether card 26 will attempt to transition to operation state 76 of ACTIVE-SINGLE, ACTIVE-REDUNDANT, or STANDBY-READY (active operational states 76). After transitioning the actual state to ONLINE for card 26, card agent 52 transitions card 26 to an active operational state 76 at step 262. Depending on the run-time data, transitioning card 26 to an active operational state 76 may include transitioning to ACTIVE-SINGLE, ACTIVE-REDUNDANT, or STANDBY-READY. Card agent 52 notifies device agent 54 of the ONLINE status at step 264.

Steps 268–280 detail the actions of device agent 54 in transitioning devices 28 on card 26 ONLINE. Device agent 54 receives notification to bring devices 28 ONLINE at step 266. Device agent 54 determines whether state information 32 contains an entry for device 28 at step 268. If not, device agent 54 then determines at step 280 whether all devices 28 have been processed. If state information 32 contains an entry for device 28, device agent 54 determines whether device 28 has a target value set to ONLINE at step 270. If not, device agent 54 skips to step 280. If device 28 has a target value configured to ONLINE, device agent 54 transitions the actual value to PREP and initializes device 28 at step 272. This may include downloading controlling software such as an ISDN protocol stack, holding device 28 in PREP state until all alarms clear, or any other suitable initialization action. After initialization, device agent 54 transitions the actual value for device 28 to ONLINE and transitions device 28 to an active operational state 76 at steps 274 and 276 respectively. Device agent 54 notifies port agent 56 to bring dependent ports 30 ONLINE at step 278. Device agent 54 determines whether all devices 28 have been processed at step 280. If not, device agent 54 continues processing at step 268. If all devices 28 have been processed, device agent 54 has completed its activities for transitioning devices 28 to ONLINE.

Steps 282–294 detail the actions of port agent 56 in transitioning devices 28 on card 26 ONLINE. Port agent 56 receives notification to brings ports 30 ONLINE at step 282. Port agent 56 determines whether stage information 32 contains an entry for port 30 at step 284. If not, port agent 56 determines whether all ports 30 have been processed at step 294. If state information 32 contains an entry for port 30, port agent 56 determines whether the target value for port 30 is configured to ONLINE at step 286. If not, port agent 56 determines whether all ports 30 have been processed at step 294. If port 30 is configured to a target value of ONLINE, port agent 56 transitions the actual value to PREP and initializes port 30 at step 288. In a particular embodiment, this transition and initialization represents merely a pass through state, and no actions are taken. Port agent 56 transitions port 30 to ONLINE and sets the actual value for configuration state 74 to ONLINE at step 290. Port agent 56 then transitions port 30 to an active operational state 76 at step 292. Port agent 56 determines whether all ports 30 have been processed at step 294. If not, port agent 56 continues processing of ports 30 at step 284.

While the steps in this flowchart are presented in a specific order, system 10 contemplates many of these steps taking place substantially simultaneously and/or in a different order. The transitions between states for each of the resources within switch 12 are limited only by dependencies between resources as shown in FIG. 4, and the hierarchical nature of state model 70. Also, this flowchart demonstrates a generic method for transitioning card 26 to ONLINE, which may be in response to a user configuring the target value for card 26 to ONLINE, card 26 being inserted into switch 12, or card 26 receiving power. A similar technique may be used to transition individual devices 28 or ports 30 ONLINE.

The preceding flowcharts each demonstrate the consistency and predictability that is provided by using a unified state model 70 for maintaining state information 32 describing resources within switch 12. This allows a user of system 10 to interact in a consistent manner with switch 12 regardless of whether the user is attempting to control card 26, devices 28, or ports 30. While the preceding flowcharts illustrate the operation of particular embodiments of switch 12, system 10 contemplates using any method employing state information 32 to transition resources between various states.

Although the present invention has been described in several embodiments, a myriad of changes and modifications may be suggested to one skilled in the art, and it is intended that the present invention encompass such changes and modifications as fall within the scope of the present appended claims.

What is claimed is:

1. An administrative agent for maintaining service state information for a telecommunications apparatus comprising:
   a card agent maintaining card state data for a plurality of cards;
   a device agent maintaining device state data for a plurality of devices on the cards; and
   a port agent maintaining port state data for a plurality of ports on the devices, wherein the card state data, the device state data, and the port state data each comprise a physical state, a configuration state, and an operational state;
   wherein the physical state indicates whether a resource is physically present, the configuration state comprises a target value and an actual value each indicating whether the resource is online or offline, and the operational state indicates an internal state of the resource, wherein the resource comprises a card, a device, or a port.

2. The administrative agent of claim 1, further comprising an interface operable to:
   display the card state data, the device state data, and the port state data; and
   receive configuration information from a user, wherein the card agent, the device agent, and the port agent update the configuration state for the card state data, the device state data, and the port state data based on the configuration information.

3. The administrative agent of claim 1, further comprising an interface operable to:
   report the card state data, the device state data, and the port state data to a remote location responsive to a request from the remote location; and
   receive configuration information from the remote location, wherein the card agent, the device agent, and the port agent update the configuration state for the card state data, the device state data, and the port state data based on the configuration information.

4. The administrative agent of claim 1, wherein:
   the actual value for the resource is valid only when the physical state indicates that the resource is present; and
   the operational state is valid only when the actual value is valid and indicates that the resource is online.

5. The administrative agent of claim 1, wherein the target value is set responsive to a user request.

6. The administrative agent of claim 1, wherein the operational state indicates a selected one of unavailable, initializing, standby-synchronizing, standby-ready, active-single, active-synchronizing, and active-redundant.

7. The administrative agent of claim 1, wherein:
   the card agent notifies the device agent if the card state data changes; and
   the device agent notifies the port agent if the device state data changes.

8. A hierarchical model for maintaining states of a telephony resource comprising:
   a first level indicating whether a resource is physically present;
   a second level having a user configurable target value set to online or offline and an actual value indicating whether the resource is online or offline, wherein the actual value is valid only when the first level indicates that the resource is present; and
   a third level indicating an internal state of the resource, wherein the internal state is valid only when the second level indicates a valid actual value of online.

9. The hierarchical model of claim 8, wherein the target value indicates a selection chosen by a user, and the target value is maintained irrespective of the actual value.

10. The hierarchical model of claim 8, wherein the resource is dependent on a primary resource, and the actual value can be set to online only when the primary resource is present and online.

11. The hierarchical model of claim 8, wherein the resource comprises a selected one of a card, a device, and a port.

12. The hierarchical model of claim 8, wherein the actual value is set to online only when the target value is set to online.

13. The hierarchical model of claim 8, wherein the internal state comprises a selected one of unavailable, initializing, standby-synchronizing, standby-ready, active-single, active-synchronizing, and active-redundant.

14. The hierarchical model of claim 13, wherein the internal state of active-redundant indicates that a similar resource is available for backup if the resource fails.

15. The hierarchical model of claim 8, wherein the hierarchical model is a data structure maintained by a computer readable medium.

16. A method for transitioning a telecommunications apparatus online, comprising:
   receiving notification to place a first resource online;
   transitioning the first resource to online;
   transitioning a plurality of second resources dependent on the first resource to online; and
   transitioning a plurality of third resources dependent on the second resources to online;
   wherein transitioning a resource to online occurs after the resource receives a notification to go online and comprises:
      determining whether the resource has a target state set to online;
      setting an actual state to online if the target state is set to online; and
      notifying any dependent resources of the resource to go online if the actual state is set to online.

17. The method of claim 16, wherein:
   the first resource comprises a card;
   the second resources comprise devices on the card; and
   the third resources comprise ports on the devices.

18. The method of claim 16, wherein receiving notification to place the first resource online comprises receiving notification from a user to switch a target state of the first resource from offline to online.

19. The method of claim 16, wherein transitioning a resource to online further comprises:
   initializing the resource if the target state is set to online; and
   updating an operational state based on internal operation of the resource.

20. The method of claim 19, wherein initializing the resource comprises downloading operational software from an external source.

21. A method for transitioning a telecommunications apparatus offline comprising:
   targeting a first resource to go offline;
   notifying a plurality of second resources dependent on the first resource to go offline;
   notifying a plurality of third resources dependent on the second resources to go offline;
   storing a target configuration state for each of the second resources and the third resources indicating whether a user has configured each resource to online or offline;
   setting an actual state for each of the third resources to offline;
   setting an actual state for each of the second resources to offline; and
   setting an actual state for the first resource to offline.

22. The method of claim 21, wherein notifying a resource to go offline comprises requesting the resource to go offline without modifying a target state for the resource.

23. The method of claim 21, wherein the first resource comprises a card, the second resources comprise devices on the card, and the third resources comprise ports on the devices.

24. The method of claim 21, wherein targeting the first resource to go offline comprises setting a target configuration state for the first resource to offline responsive to a request from the user.

25. The method of claim 21, wherein:
   setting the actual state for each of the third resources to offline comprises setting the actual state for each of the third resources to offline when each of the third resources does not support a current communication session;
   setting the actual state for each of the second resources to offline comprises setting the actual state for each of the second resources to offline when the actual state for all of the third resources dependent on each of the second resources is set to offline; and
   setting the actual state for the first resource to offline comprises setting the actual state for the first resource to offline when the actual state for all of the second resources is set to offline.

26. The method of claim 21, wherein:
   setting the actual state for each of the third resources to offline comprises setting the actual state for each of the third resources to offline when notification to go offline is received from the second resources;
   setting the actual state for each of the second resources to offline comprises setting the actual state for each of the second resources to offline when notification to go offline is received from the first resource; and
   setting the actual state for the first resource to offline comprises setting the actual state for the first resource to offline when a target configuration state for the first resource is set to offline.

27. Software for maintaining service state information for a telecommunications apparatus, the software embodied in a computer readable medium and operable to:

maintain card state data for a plurality of cards;

maintain device state data for a plurality of devices on the cards; and maintain port state data for a plurality of ports on the devices, wherein the card state data, the device state data, and the port state data each comprise a physical state, a configuration state, and an operational state;

wherein the physical state indicates whether a resource is physically present, the configuration state comprises a target value and an actual value each indicating whether the resource is online or offline, and the operational state indicates an internal state of the resource, wherein the resource comprises a card, a device, or a port.

28. The software of claim 27, further operable to:

display the card state data, the device state data, and the port state data; and receive configuration information from a user; and update the configuration state for the card state data, the device state data, and the port state data based on the configuration information.

29. The software of claim 27, operable to:

report the card state data, the device state data, and the port state data to a remote location responsive to a request form the remote location; and receive configuration information form the remote location; and update the configuration state for the card state data, the device state data, and the port state data based on the configuration information.

30. The software of claim 27, wherein:

the actual value for the resource is valid only when the physical state indicates that the resource is present; and the operational state is valid only when the actual value is valid and indicates that the resource is online.

31. The software of claim 27, further operable to set the target value responsive to a user request.

32. The software of claim 27, wherein the operational state indicates a selected one of unavailable, initializing, standby-synchronizing, standby-ready, active-single, active-synchronizing, and active-redundant.

33. A telecommunications apparatus comprising:

means for maintaining card state data for a plurality of cards;

means for maintaining device state data for a plurality of devices on the cards; and means for maintaining port state data for a plurality of ports on the devices, wherein the card state data, the device state data, and the port state data each comprise a physical state, a configuration state, and an operational state;

wherein the physical state indicates whether a resource is physically present, the configuration state comprises a target value and an actual value each indicating whether the resource is online or offline, and the operational state indicates an internal state of the resource, wherein the resource comprises a card, a device, or a port.

34. The telecommunications apparatus of claim 33, further comprising:

means for displaying the card state data, the device state data, and the port state data; and means for receiving configuration information from a user; and means for updating the configuration state for the card state data, the device state data, and the port state data based on the configuration information.

35. The telecommunications apparatus of claim 33, further comprising:

means for reporting the card state data, the device state data, and the port state data to a remote location responsive to a request from the remote location; and means for receiving configuration information from the remote location; and means for updating the configuration state for the card state data, the device state data, and the port state data based on the configuration information.

36. The telecommunications apparatus of claim 33, wherein:

the actual value for the resource is valid only when the physical state indicates that the resource is present; and the operational state is valid only when the actual value is valid and indicates that the resource is online.

37. The telecommunications apparatus of claim 33, wherein the operational state indicates a selected one of unavailable, initializing, standby-synchronizing, standby-ready, active-single, active-synchronizing, and active-redundant.

38. A telecommunications apparatus comprising:

a plurality of first resources;

a plurality of second resources dependent on the first resources;

a plurality of third resources dependent on the second resources;

an administrative agent comprising:

a first agent maintaining first state data for the first resources;

a second agent maintaining second state data for the second resources; and a third agent maintaining third state data for the third resources; and a memory storing the first state data, the second state data, and the third state data, wherein the first state data, the second state data, and the third state data each comprise a physical state, a configuration state, and an operational state;

wherein the physical state indicates whether a resource is physically present, the configuration state comprises a user configurable target value set to online or offline and an actual value indicating whether the resource is online or offline, the actual value valid only when the physical state indicates that the resource is present, and the operational state comprises an internal state of the resource, wherein the internal state is valid only when the actual value of the configuration state is valid and indicates a value of online.

39. A telecommunications apparatus comprising:

a plurality of cards;

a plurality of devices on each of the cards;

a plurality of ports on each of the devices;

an administrative agent comprising:

a first agent maintaining first state data for the cards;

a second agent maintaining second state data for the devices; and a third agent maintaining third state data for the ports; and a memory storing the first state data, the second state data, and the third state data, wherein the first state data, the second state data, and the third state data each comprise a physical state, a configuration state having a target value and an actual value each indicating online or offline, and an operational state;

the administrative agent operable to:

receive notification to place a selected one of the cards online;

transition the selected card to online;

transition the devices on the selected card to online; and transition the ports on the transitioned devices to online;

wherein transitioning a resource to online occurs after the resource receives a notification to go online and comprises determining whether the resource has the target value set to online, setting the actual value to online if the target value is set to online, and notifying any dependent resources of the resource to go online if the actual value is set to online, wherein the resource comprises a card, device, or a port.

* * * * *